(12) United States Patent
Miyamoto

(10) Patent No.: US 12,282,622 B2
(45) Date of Patent: *Apr. 22, 2025

(54) SYSTEM INCLUDING PEN AND TOUCH CONTROLLER, METHOD EXECUTED BY PEN, PEN, AND TOUCH CONTROLLER

(71) Applicant: Wacom Co., Ltd., Saitama (JP)

(72) Inventor: Masayuki Miyamoto, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/637,162

(22) Filed: Apr. 16, 2024

(65) Prior Publication Data
US 2024/0264693 A1  Aug. 8, 2024

Related U.S. Application Data

(63) Continuation of application No. 18/296,896, filed on Apr. 6, 2023, now Pat. No. 11,989,366, which is a (Continued)

(51) Int. Cl.
*G06F 3/041* (2006.01)
*G06F 3/0354* (2013.01)
(Continued)

(52) U.S. Cl.
CPC ...... *G06F 3/04162* (2019.05); *G06F 3/03545* (2013.01); *G06F 3/0383* (2013.01);
(Continued)

(58) Field of Classification Search
CPC ............. G06F 3/04162; G06F 3/03545; G06F 3/0383; G06F 3/0441; G06F 3/0442; H04W 72/21; H04W 72/23
See application file for complete search history.

(56) References Cited

U.S. PATENT DOCUMENTS 9,977,519 B2    5/2018  Lukanc et al.
11,989,366 B2*  5/2024  Miyamoto ............ H04W 72/23
                        (Continued)

FOREIGN PATENT DOCUMENTS

DE  112011102971 T5  8/2013
KR  20200025573 A    3/2020
(Continued)

OTHER PUBLICATIONS

English translation of International Search Report, mailed Nov. 22, 2021, for International Patent Application No. PCT/JP2021/034014. (2 pages).

*Primary Examiner* — Temesghen Ghebretinsae
*Assistant Examiner* — Ivelisse Martinez Quiles
(74) *Attorney, Agent, or Firm* — Seed IP Law Group LLP

(57) ABSTRACT

An active pen and a touch controller are configured to use a frame F including a plurality of temporally separated time slots TS0 to TSm to transmit and receive signals with each other. Each of the active pen and the touch controller can transmit and detect a reference signal for synchronizing a frame position, which is a temporal position of the frame F, and upon detecting the reference signal acquires the frame position based on the reference signal and operates according to the acquired frame position. The active pen is configured to transmit, when changing a master of the synchronization, a reference change signal CH indicating that the active pen itself is the master of the synchronization.

18 Claims, 9 Drawing Sheets

Related U.S. Application Data continuation of application No. PCT/JP2021/034014, filed on Sep. 15, 2021.

(51) Int. Cl.
- *G06F 3/038* (2013.01)
- *G06F 3/044* (2006.01)
- *H04W 72/21* (2023.01)
- *H04W 72/23* (2023.01)

(52) U.S. Cl.
CPC .......... *G06F 3/0441* (2019.05); *G06F 3/0442* (2019.05); *H04W 72/21* (2023.01); *H04W 72/23* (2023.01)

(56) References Cited

U.S. PATENT DOCUMENTS

| | | | |
|---|---|---|---|
| 2010/0155153 A1 | 6/2010 | Zachut | |
| 2012/0068964 A1* | 3/2012 | Wright | G06F 3/0442 345/174 |
| 2012/0105362 A1* | 5/2012 | Kremin | G06F 3/0446 345/174 |
| 2013/0207925 A1* | 8/2013 | Ryshtun | G06F 3/0446 345/174 |
| 2013/0207938 A1* | 8/2013 | Ryshtun | G06F 3/0441 178/19.03 |
| 2014/0333559 A1 | 11/2014 | Wilson et al. | |
| 2016/0299583 A1 | 10/2016 | Watanabe | |
| 2019/0121455 A1 | 4/2019 | Hara et al. | |
| 2020/0026369 A1 | 1/2020 | Hisano | |

FOREIGN PATENT DOCUMENTS

| | | |
|---|---|---|
| WO | WO 2016139861 A1 | 9/2016 |
| WO | WO 2018003122 A1 | 1/2018 |
| WO | WO 2020017477 A1 | 1/2020 |

\* cited by examiner

SYSTEM INCLUDING PEN AND TOUCH CONTROLLER, METHOD EXECUTED BY PEN, PEN, AND TOUCH CONTROLLER

TECHNICAL FIELD

The present invention relates to a system including a pen and a touch controller, a method executed by a pen, a pen, and a touch controller.

BACKGROUND ART

A position detection system is known which performs one-way communication from a pen to a touch controller, in which a signal transmitted from the pen (hereinafter a "pen signal") is used to synchronize the touch controller with the pen. An example of the position detection system is disclosed in Patent Document 1.

In the position detection system capable of one-way communication, it is possible that the pen may transmit an unnecessary pen signal, and power is wasted as a result of such unnecessary transmission. For example, with a touch controller configured to detect a pen in a time division manner with respect to detecting a finger touch, driving display pixels, etc., a pen signal transmitted from the pen, outside a period in which the touch controller is to detect the pen, is not received by the touch controller and, therefore, such pen signal does not need to be transmitted. Thus, more recently, a position detection system which performs two-way communication between a pen and a touch controller has been introduced. In the two-way communication, the pen can transmit a pen signal when the touch controller needs the pen signal to avoid wasteful power consumption. Examples of such position detection system capable of two-way communication between a pen and a touch controller are disclosed in Patent Documents 2 and 3.

Prior Art Document

Patent Documents
Patent Document 1: U.S. Published Application No. 2010/0155153
Patent Document 2: U.S. Pat. No. 9,977,519
Patent Document 3: PCT Patent Publication No. WO 2016/139861

SUMMARY OF INVENTION

Technical Problems

In the position detection system capable of two-way communication between a pen and a touch controller, a frame including a plurality of time slots is used. The touch controller transmits an uplink signal at the beginning of each frame, and the pen uses one or more time slots to transmit pen signals. The frame structure as well as the time slots used by the pen are predefined according to a protocol. An uplink signal plays a role of indicating a temporal position of a frame (hereinafter a "frame position"), and the pen is configured to acquire the frame position based on the reception timing of the uplink signal, and to determine the transmission timing of the pen signal and the reception timing of the next uplink signal according to the acquired frame position.

The pen may fail to receive an uplink signal due to the influence of external noise or the like. Consequently, the pen may not be able to acquire the frame position to transmit a pen signal and, as a result, rendering (drawing) of a stroke being input may stop to generate a so-called "break in a line." The inventor of the present application has considered configuring a pen that can apply the frame position acquired based on the last received uplink signal to the frame in which the uplink signal cannot be received, so that the pen can transmit pen signals even if the pen fails receive the uplink signal.

However, frequencies of clock signals between the pen and the touch controller typically do not match completely and, therefore, if the pen applies the frame position as described above to transmit pen signals, the timing gradually becomes off, and it becomes difficult for the touch controller to receive pen signals. Thus, a further technique is needed to prevent interruption in a stroke drawing even when the pen fails to receive an uplink signal.

Accordingly, an object of the present invention is to provide a system including a pen and a touch controller, a method executed by a pen, a pen, and a touch controller that can prevent a break in a line when the pen fails to receive an uplink signal.

Technical Solution

The present invention provides a system including a pen and a touch controller, in which the pen and the touch controller are configured to use a frame including a plurality of temporally separated pen detection periods to transmit and receive signals with each other. Each of the pen and the touch controller can transmit and detect a reference signal for synchronizing a frame position, acquires the frame position based on the reference signal when the reference signal is detected, and operates according to the acquired frame position. The pen is configured to transmit, when changing a master of the synchronization, a reference change signal indicating that the pen itself is the master of the synchronization.

The present invention provides a method executed by a pen in a system including the pen and a touch controller, the method including: a step of performing a detection operation of the next reference signal according to a frame position acquired based on a reference signal transmitted from the touch controller; a step of determining whether or not the reference signal is received in the detection operation; and when it is determined that the reference signal is not received in the detection operation, a step of transmitting a reference change signal indicating that the pen itself is to be a master of synchronizing the frame position.

The present invention provides a pen including an integrated circuit and a pen tip electrode and configured to perform two-way communication with a touch controller. The integrated circuit uses the pen tip electrode to perform a detection operation of the next reference signal according to a frame position acquired based on a reference signal transmitted from the touch controller, determines whether or not the reference signal is received in the detection operation, and when it is determined that the reference signal is not received in the detection operation, transmits, from the pen tip electrode, a reference change signal indicating that the integrated circuit is to be a master of synchronizing the frame position.

The present invention provides a touch controller that performs two-way communication with a pen through a sensor to derive a position of the pen. The touch controller acquires a frame position according to a reference signal for synchronizing the frame position transmitted from the pen when the touch controller receives, from the pen, a reference change signal indicating that the pen is to be a master of the synchronization of the frame position. The touch controller performs a detection operation of a downlink signal transmitted from the pen and a transmission of an uplink signal to the pen according to the acquired frame position.

Advantageous Effects

According to the present invention, a pen can be a master of frame synchronization as necessary, and this can prevent generation of a break in a line when the pen fails to receive an uplink signal.

EMBODIMENTS OF THE INVENTION

Hereinafter, a preferred embodiment of the present invention will be described in detail with reference to the attached drawings.

Figure 1:
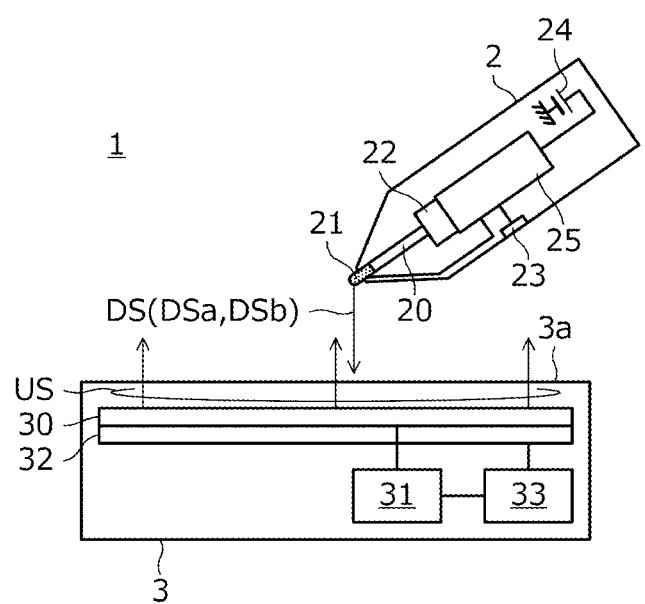
FIG. 1 is a diagram illustrating a configuration of a position detection system 1 according to an embodiment of the present invention.

FIG. 1 is a diagram illustrating a configuration of a position detection system 1 according to the embodiment of the present invention. As illustrated in FIG. 1, the position detection system 1 includes an active pen 2 and an electronic device 3 that is a position detection apparatus configured to detect the active pen 2.

The electronic device 3 is a computer, such as a tablet computer and a digitizer, including a touch surface 3a. The electronic device 3 includes a sensor 30 arranged just below the touch surface 3a, a touch controller 31 connected to the sensor 30, a display 32 placed over the sensor 30, and a host processor 33 that controls these and other components of the electronic device 3.

The host processor 33 is a control processing unit of the electronic device 3, and the host processor 33 is configured to read various programs from a memory, not illustrated, and execute the programs. The programs executed in this way include various applications including an operating system of the electronic device 3 and a drawing application. Of these, the drawing application is a program which executes a process of generating digital ink based on a position and data acquired by the touch controller 31 and storing the digital ink in the memory of the electronic device 3, and a process of rendering the generated digital ink, generating a video signal indicative of the rendering result, and supplying the video signal to the display 32. The display 32 is an apparatus that displays the video signal supplied from the host processor 33, and the display 32 may be, for example, a liquid crystal display or an organic electroluminescent (EL) display.

The sensor 30 is an apparatus including a plurality of sensor electrodes arranged in the touch surface 3a. The plurality of sensor electrodes include a plurality of X-electrodes extending along a Y-direction in the touch surface 3a and arranged side by side at equal intervals in an X-direction orthogonal to the Y-direction in the touch surface 3a, and a plurality of Y-electrodes extending along the X-direction and arranged side by side at equal intervals along the Y-direction.

Some of the plurality of sensor electrodes included in the sensor 30 can also be used as common electrodes of the display 32 (electrodes that supply a common ground potential to the pixels). The electronic device 3 in which some of the sensor electrodes are also used as common electrodes of the display is called an "in-cell" position detection apparatus. On the other hand, the electronic device 3 is which no sensor electrodes are also used as common electrodes of the display is called an "on-cell" or "out-cell" position detection apparatus. Although the present invention can be readily applied in any type of the electronic device 3, in the following description the electronic device 3 is depicted as an in-cell position detection apparatus.

The touch controller 31 is an integrated circuit with a function of detecting a position of the active pen 2 and a position of a passive pointer (for example, a human finger) in the touch surface 3a. Specifically, the touch controller 31 is configured to use an active electrostatic system to detect a position of the active pen 2 and use a capacitance system to detect a position of the passive pointer.

Position detection of the active pen 2 based on the active electrostatic system will be described in detail. The touch controller 31 executes a process of performing two-way communication with the active pen 2 through the sensor 30 to derive a position of the active pen 2 in the touch surface 3a and acquires data from the active pen 2. As used herein, a signal transmitted from the touch controller 31 to the active pen 2 in the two-way communication is referred to as an "uplink signal US," and a signal transmitted from the active pen 2 to the touch controller 31 is referred to as a "downlink signal DS."

The downlink signal DS is a type of pen signal. In the present embodiment, pen signal also includes a "reference change signal CH" in addition to the "downlink signal DS," as will be described later. The touch controller 31 changes the potential of the sensor electrodes included in the sensor 30 to transmit the uplink signal US, and detects a change in the potential of the sensor electrodes included in the sensor 30 to receive the downlink signal DS and the reference change signal CH.

The touch controller 31 is configured to set a frame based on information regarding a time period during which the display 32 does not drive display pixels (hereinafter a "blank time period"). The touch controller 31 is configured to arrange, in the frame, a plurality of time slots (a plurality of temporally separated pen detection periods) for the touch controller 31 to detect pen signals, and a plurality of passive pointer detection periods for the touch controller 31 to detect a passive pointer. The touch controller 31 receives pen signals in the time slots and executes the process of detecting a passive pointer in the passive pointer detection periods.

The host processor 33 notifies the touch controller 31 of the information regarding the blank time period. The touch controller 31 determines a frame position based on the information regarding the blank time period received from the host processor 33 and arranges the plurality of time slots and the plurality of passive pointer detection periods in the frame. Each frame is typically arranged to include a plurality of blank time periods, and the plurality of time slots and the plurality of passive pointer detection periods are dispersed in the blank time periods.

Here, a communication protocol defining the communication method between the active pen 2 and the touch controller 31 predefines multiple patterns of different temporal arrangements of the time slots and the passive pointer detection periods in the frame. The touch controller 31 is configured to select one of the multiple patterns based on the information regarding the blank time period received from the host processor 33 to arrange the plurality of time slots and the plurality of passive pointer detection periods in the frame. The touch controller 31 also executes a process of using a command in the uplink signal US to notify the active pen 2 of the selected pattern and information indicating which time slots the active pen 2 should use to transmit pen signals.

The uplink signal US is a signal which functions as a reference signal for notifying the frame position from the touch controller 31 to the active pen 2, and which also plays the role of transmitting a command for controlling the active pen 2 from the touch controller 31. The touch controller 31 is configured to transmit the uplink signal US at the beginning of a frame, and the active pen 2 is configured to acquire the frame position based on the reception timing of the uplink signal US. In addition, the active pen 2 is configured to acquire, from the command included in the uplink signal US, the frame structure (such as temporal arrangement of the plurality of time slots) and the information indicating which time slots the active pen 2 should actually use to transmit pen signals. Hereinafter, the frame position, the frame structure, and the information indicating the time slots to be used will be collectively referred to as a "transmission and reception schedule" in some cases.

The downlink signal DS is a signal including a position signal, which is an unmodulated carrier signal, and a data signal, which is a carrier signal modulated with various types of data such as a pen pressure value and switch information, to be described later. The active pen 2 is configured to transmit the downlink signal DS according to the transmission and reception schedule acquired based on the uplink signal US. The touch controller 31 derives a position of the active pen 2 based on the distribution of the reception strength of the position signals in the plurality of sensor electrodes included in the sensor 30. The touch controller 31 uses the sensor electrode closest to the derived position among the plurality of sensor electrodes to receive the data signal and demodulates the data signal to acquire the data transmitted from the active pen 2.

The active pen 2 includes a core body 20, a pen tip electrode 21, a pressure sensor 22, a side switch 23, a battery 24, and an integrated circuit 25 as illustrated in FIG. 1. The core body 20 is a part included along a pen axis of the active pen 2. A front end of the core body 20 is included in a pen tip of the active pen 2, and a back end is abutted against the pressure sensor 22. The pen tip electrode 21 is a conductor provided on the front end (pen tip) of the core body 20, and the pen tip electrode 21 is electrically connected to the integrated circuit 25.

The pressure sensor 22 is a sensor that detects the pressure applied to the pen tip. The pressure detected by the pressure sensor 22 is supplied as a pen pressure value of 12 bits, for example, to the integrated circuit 25. The side switch 23 is a press-button switch provided on the surface of the active pen 2, and the user can turn on and off the side switch 23. The operation state (on-off state) of the side switch 23 is supplied as switch information of 2 bits, for example, to the integrated circuit 25. The battery 24 supplies power necessary for the operation of the integrated circuit 25.

The integrated circuit 25 is a circuit that executes processes such as receiving the uplink signal US, and generating and transmitting the downlink signal DS and the reference change signal CH. The integrated circuit 25 receives the uplink signal US by detecting a change in the potential of the pen tip electrode 21. The integrated circuit 25 changes the potential of the pen tip electrode 21 to transmit pen signals (specifically, the downlink signal DS and the reference change signal CH).

Figure 2:
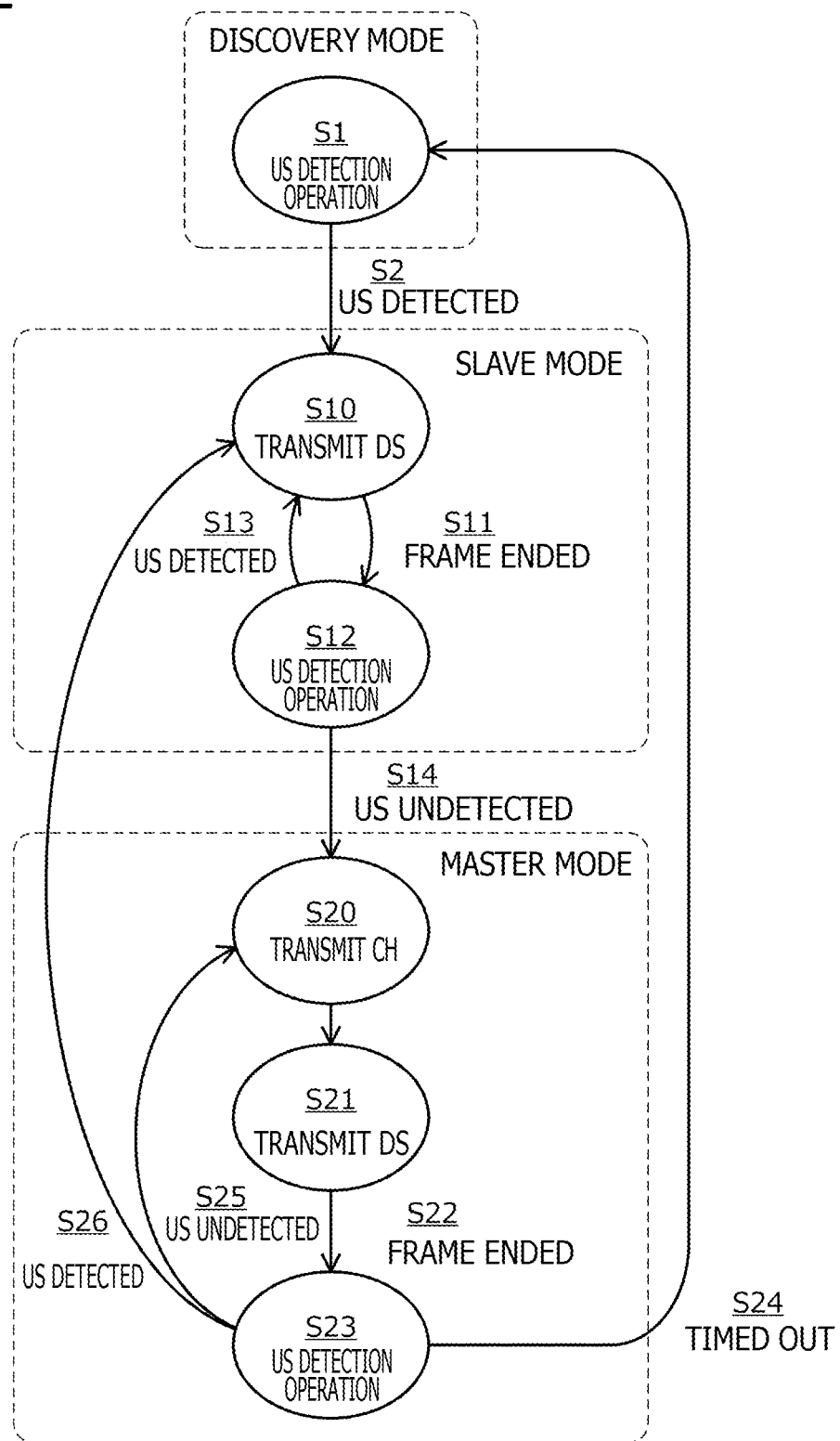
FIG. 2 is a state transition diagram of an integrated circuit 25 of an active pen 2.

FIG. 2 is a state transition diagram of the integrated circuit 25. As illustrated in FIG. 2, the integrated circuit 25 is configured to operate in one of a discovery mode, a slave mode, and a master mode. The initial state is the discovery mode, and the integrated circuit 25 in the discovery mode continuously or intermittently performs a detection operation of the uplink signal US (step S1).

When the integrated circuit 25 detects the uplink signal US as a result of the detection operation in step S1 (step S2), the integrated circuit 25 enters the slave mode and acquires a transmission and reception schedule based on the received uplink signal US. The integrated circuit 25 then transmits the downlink signal DS according to the acquired transmission and reception schedule (step S10). In addition, when the acquired transmission and reception schedule indicates that the end timing of the frame is reached (step S11), the integrated circuit 25 performs a detection operation of the next uplink signal US (step S12). When the integrated circuit 25 detects the uplink signal US as a result of the detection operation (step S13), the integrated circuit 25 acquires a transmission and reception schedule again based on the uplink signal US and repeats the process of step S10.

On the other hand, the integrated circuit 25 that has not detected the uplink signal US as a result of the detection operation in step S12 enters the master mode (step S14). The integrated circuit 25 in the master mode applies the last-acquired transmission and reception schedule to the current frame (the frame in which the undetected uplink signal US is transmitted). For example, it may be sufficient that the integrated circuit 25 shifts the last-acquired transmission and reception schedule backward by a time period corresponding to the time length UpIntv of the frame, in order to acquire the transmission and reception schedule for the current frame.

There is a possibility that the transmission and reception schedule acquired by the integrated circuit 25 in this way is different from the transmission and reception schedule determined within the touch controller 31. Therefore, the integrated circuit 25 transmits, in the time slot at the beginning of the current frame (hereinafter referred to as a "top slot"), a reference change signal CH indicating that the integrated circuit 25 is to be the master of synchronization (frame synchronization) (step S20). In the present embodiment, the top slot of each frame is reserved for transmitting the reference change signal CH, and the top slot is not used for transmitting the downlink signal DS. Therefore, the integrated circuit 25 in the slave mode sets the top slot to mute (a state in which the signal is not transmitted).

Subsequently, the integrated circuit 25 transmits the downlink signals DS according to the acquired transmission and reception schedule (step S21). When the acquired transmission and reception schedule indicates that the end timing of the frame is reached (step S22), the integrated circuit 25 performs the detection operation of the next uplink signal US (step S23). When the integrated circuit 25 does not detect the uplink signal US as a result of the detection operation (step S24), the integrated circuit 25 determines whether or not a predetermined time has passed since the last detection of the uplink signal US. When the integrated circuit 25 determines that the predetermined time has passed, the integrated circuit 25 returns to the discovery mode and executes the process from step S1 (step S24). On the other hand, when the integrated circuit 25 determines that the predetermined time has not passed, the integrated circuit 25 repeats the process from step S20 (step S25). The integrated circuit 25 in this case is configured to acquire the transmission and reception schedule for the current frame based on the last acquired transmission and reception schedule similarly to when the integrated circuit 25 has entered the master mode.

The integrated circuit 25 that has detected the uplink signal US in step S23 returns to the slave mode and executes the process from step S10 (step S26). That is, the uplink signal US transmitted from the touch controller 31 functions as a reference change signal indicating that the touch controller 31 is to be the master of synchronization. The integrated circuit 25 that has received the uplink signal US as a reference change signal stops being the master of synchronization and returns to being a slave device. The integrated circuit 25 in this case acquires the transmission and reception schedule for the current frame based on the newly received uplink signal US.

Figure 3:
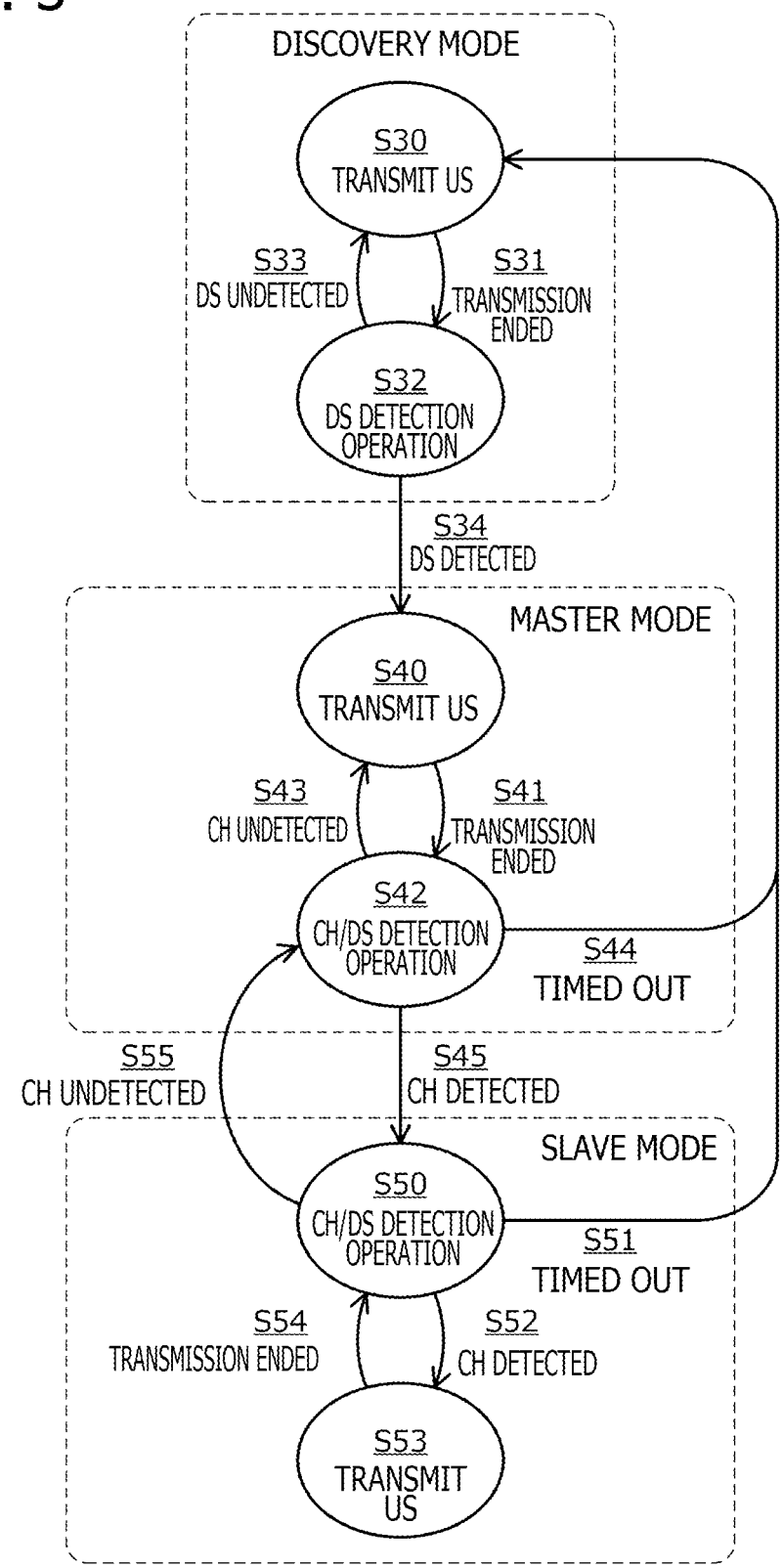
FIG. 3 is a state transition diagram of a touch controller 31 corresponding to the state transition of the integrated circuit 25 illustrated in FIG. 2.

FIG. 3 is a state transition diagram of the touch controller 31 corresponding to the state transition of the integrated circuit 25 illustrated in FIG. 2. As illustrated in FIG. 3, the touch controller 31 is also configured to operate in one of the discovery mode, the slave mode, and the master mode. The initial state is the discovery mode. The touch controller 31 in the discovery mode determines a transmission and reception schedule based on the information regarding the blank time period supplied from the host processor 33 and transmits the uplink signal US at the beginning of the frame (step S30). In addition, after the end of the transmission of the uplink signal US (step S31), the touch controller 31 performs a detection operation of the downlink signal DS in each time slot (step S32). Note that the touch controller 31 in the discovery mode does not need to perform the detection operation of the reference change signal CH.

When the end timing of the frame is reached without detection of the downlink signal DS as a result of the detection operation in step S32 (step S33), the touch controller 31 again determines a transmission and reception schedule and returns to step S30 to repeat the transmission of the uplink signal US. The touch controller 31 in this case may shift the last determined transmission and reception schedule backward by a time period corresponding to the time length UpIntv of the frame (see FIGS. 4 and 5) to determine the transmission and reception schedule for the current frame, or may determine a new transmission and reception schedule based on the information regarding the blank time period previously or newly supplied from the host processor 33.

On the other hand, the touch controller 31 that has detected a downlink signal DS as a result of the detection operation in step S32 enters the master mode (step S34). The touch controller 31 in the master mode sets the active pen 2 that has transmitted the downlink signal DS as a communication partner, and transmits the uplink signal US (step S40). After the end of the uplink signal US transmission (step S41), the touch controller 31 performs a detection operation of the reference change signal CH and the downlink signal DS (step S42).

When the touch controller 31 does not detect a reference change signal CH in step S42 (step S43), the touch controller 31 executes a detection operation of the downlink signal DS while remaining in the master mode. The touch controller 31 executes a process similar to the process after entering the master mode to determine a transmission and reception schedule. The touch controller 31 returns to step S40 and transmits the uplink signal US. In addition, when the state without detection of the downlink signal DS continues for a predetermined time period or longer in step S42 (step S44), the touch controller 31 returns to the discovery mode and executes the process from step S30.

On the other hand, when the touch controller 31 detects a reference change signal CH in step S42 (step S45), the touch controller 31 enters the slave mode. The touch controller 31 acquires a transmission and reception schedule based on the reference change signal CH and continues to perform the detection operation of the downlink signal DS (step S50). In this case, the touch controller 31 acquires the frame position based on the reception timing of the reference change signal CH. Therefore, the reference change signal CH functions as a reference signal to notify the frame position to the touch controller 31 in the slave mode. On the other hand, as information other than the frame position (information regarding the frame structure and the time slots) in the transmission and reception schedule, the touch controller 31 applies the information in the previously determined transmission and reception schedule. In other words, the touch controller 31 in the slave mode transfers to the active pen 2 only the right to determine the frame position among plural types of information included in the transmission and reception schedule.

When the state without detection of the downlink signal DS continues for a predetermined time period or longer in step S50 (step S51), the touch controller 31 returns to the discovery mode and executes the process from step S30. In addition, when the touch controller 31 detects the reference change signal CH in step S50 (step S52), the touch controller 31 acquires a transmission and reception schedule based on the reference change signal CH. The touch controller 31 executes the detection operation of the downlink signal DS and then transmits the uplink signal US (step S53). After the end of the uplink signal US transmission (step S54), the touch controller 31 returns to step S50 and performs the detection operation of the reference change signal CH and the downlink signal DS.

When the touch controller 31 does not detect the reference change signal CH in step S50 (step S55), the touch controller 31 returns to the master mode and executes the detection operation of the downlink signal DS (step S42). The touch controller 31 returning to the master mode in this way executes a process similar to the process after entering the master mode to determine a transmission and reception schedule, and transmits the uplink signal US in step S40.

As described above, the position detection system 1 according to the present embodiment can set the active pen 2 as the master of frame synchronization when the active pen 2 fails to receive the uplink signal US. This can prevent a break in a line when the active pen 2 fails to receive the uplink signal US. Hereinafter, the operation of the active pen 2 and the touch controller 31 to prevent a break in a line will be described in detail with reference to FIGS. 4 to 9.

Figure 4:
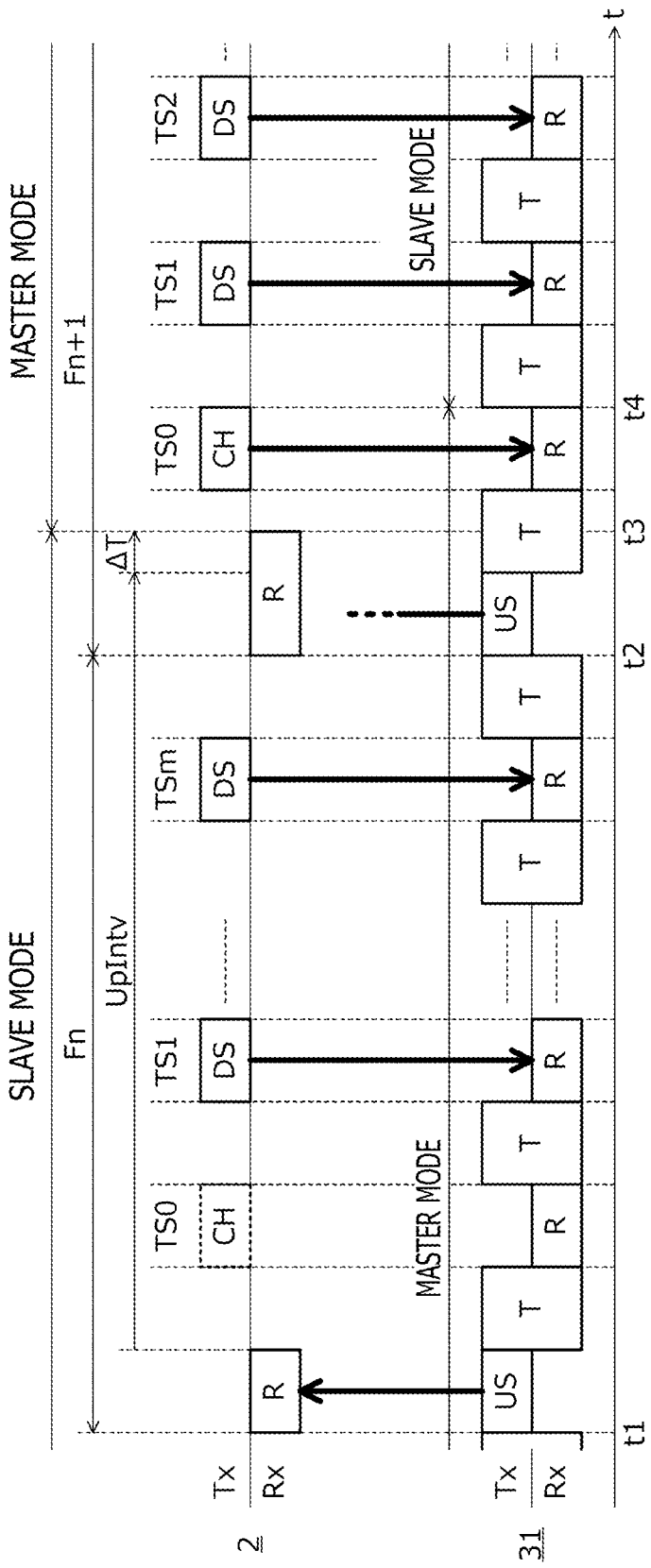
FIG. 4 is a diagram illustrating time variation of signals transmitted and received between the active pen 2 and the touch controller 31.
Figure 5:
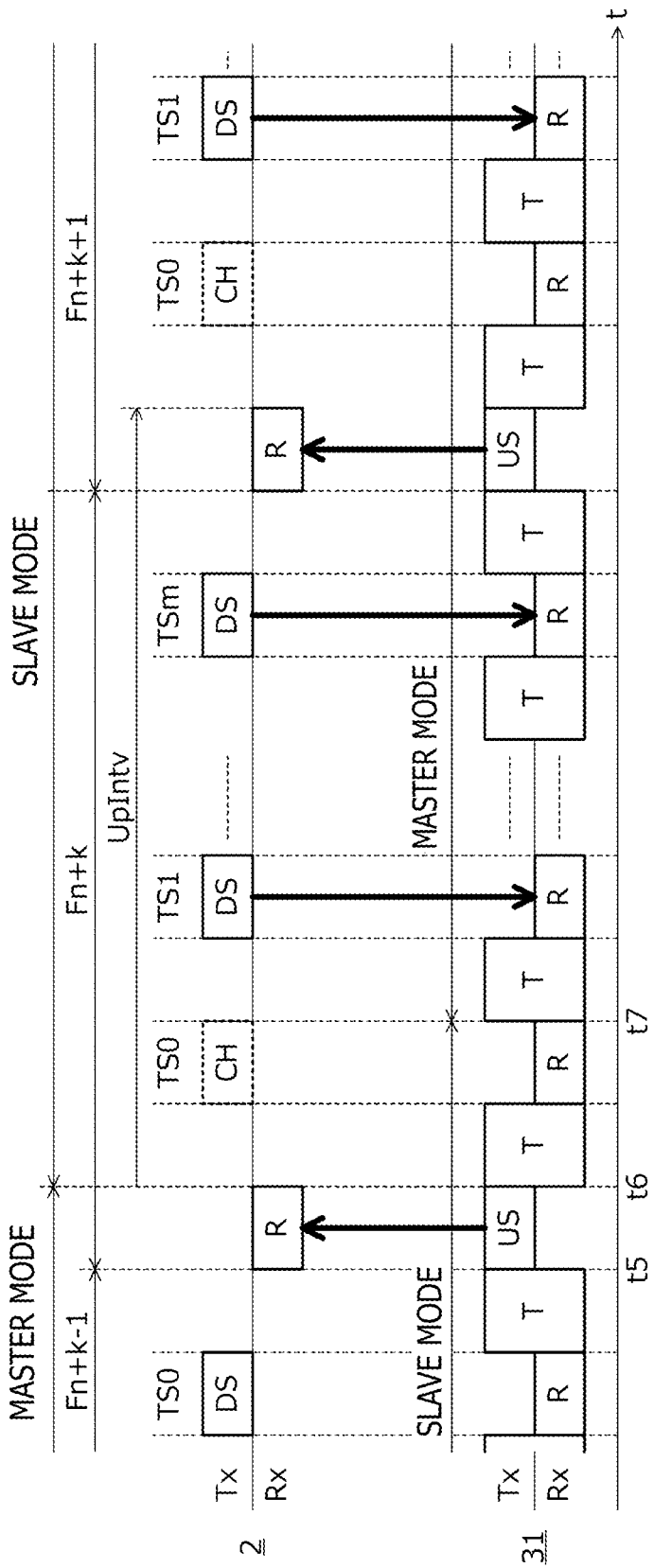
FIG. 5 is a diagram illustrating the time variation of signals transmitted and received between the active pen 2 and the touch controller 31.

FIGS. 4 and 5 are diagrams illustrating time variation of signals transmitted and received between the active pen 2 (the integrated circuit 25 of the active pen 2) and the touch controller 31. FIG. 4 illustrates a case in which the active pen 2 shifts from the slave mode to the master mode, and FIG. 5 illustrates a case in which the active pen 2 shifts from the master mode to the slave mode. FIGS. 4 and 5 illustrate a frame F and m+1 time slots TS (TS0 to TSm) set in the frame F. The time slot TS0 is the top slot. "R" in the drawings represents a reception period of a signal. "T" represents a detection period of a passive pointer. "UpIntv" represents a time length of the frame F. Note that FIGS. 4 and 5 illustrate only the period corresponding to the blank time period, and the time period in which the display 32 drives its pixels is not depicted.

First, the active pen 2 in FIG. 4 successfully receives the uplink signal US transmitted from the touch controller 31 at the top (time t1) of the nth frame Fn. The active pen 2 in this case maintains the slave mode. The active pen 2 acquires a transmission and reception schedule based on the received uplink signal US and then uses the time slots TS1 to TSm to transmit the downlink signals DS. The active pen 2 in this case does not transmit any signal in the time slot TS0.

Subsequently, the active pen 2 in the example of FIG. 4 fails to receive the uplink signal US transmitted from the touch controller 31 at the top (time t2) of the (n+1)th frame Fn+1. The active pen 2 in this case continues the detection operation of the uplink signal US until time t3, which results from adding the time length UpIntv of the frame F and a predetermined time $\Delta T$ to the end of the reception of the last uplink signal US. The active pen 2 then enters the master mode. Note that the active pen 2 with the pen pressure value of 0 at this point, that is, the active pen 2 in a hover state at this point may continue the slave mode, as will be described in detail later with reference to FIGS. 6 and 7.

The active pen 2 in the master mode uses the transmission and reception schedule acquired in the nth frame Fn to determine the transmission and reception schedule of the (n+1)th frame Fn+1. The active pen 2 then uses the time slot TS0 to transmit the reference change signal CH and uses the time slots TS1 to TSm to transmit the downlink signals DS. The touch controller 31 that has received the reference change signal CH at time t4 enters the slave mode and starts the operation according to the reception timing of the reference change signal CH.

Next, in FIG. 5, the active pen 2 successfully receives the uplink signal US transmitted from the touch controller 31 at the top (time t5) of the (n+k)th frame Fn+k and enters the slave mode. As a result, the active pen 2 does not transmit the reference change signal CH in the time slot TS0 of the frame Fn+k and continues to transmit the downlink signals DS in the time slots TS1 to TSm of the frame Fn+k.

The touch controller 31, after detecting that the active pen 2 has not transmitted the reference change signal CH in the time slot TS0, enters the master mode. In the time slots TS1 to TSm of the frame Fn+k, the touch controller 31 continues to use the transmission and reception schedule acquired based on the reference change signal CH to receive the downlink signals DS. The touch controller 31 then determines a transmission and reception schedule based on the information regarding the blank time period supplied from the host processor 33, and transmits the uplink signal US at the beginning of a frame Fn+k+1 according to the determined transmission and reception schedule. Subsequently, the active pen 2 starts the operation based on the reception timing of the uplink signal US.

Figure 6:
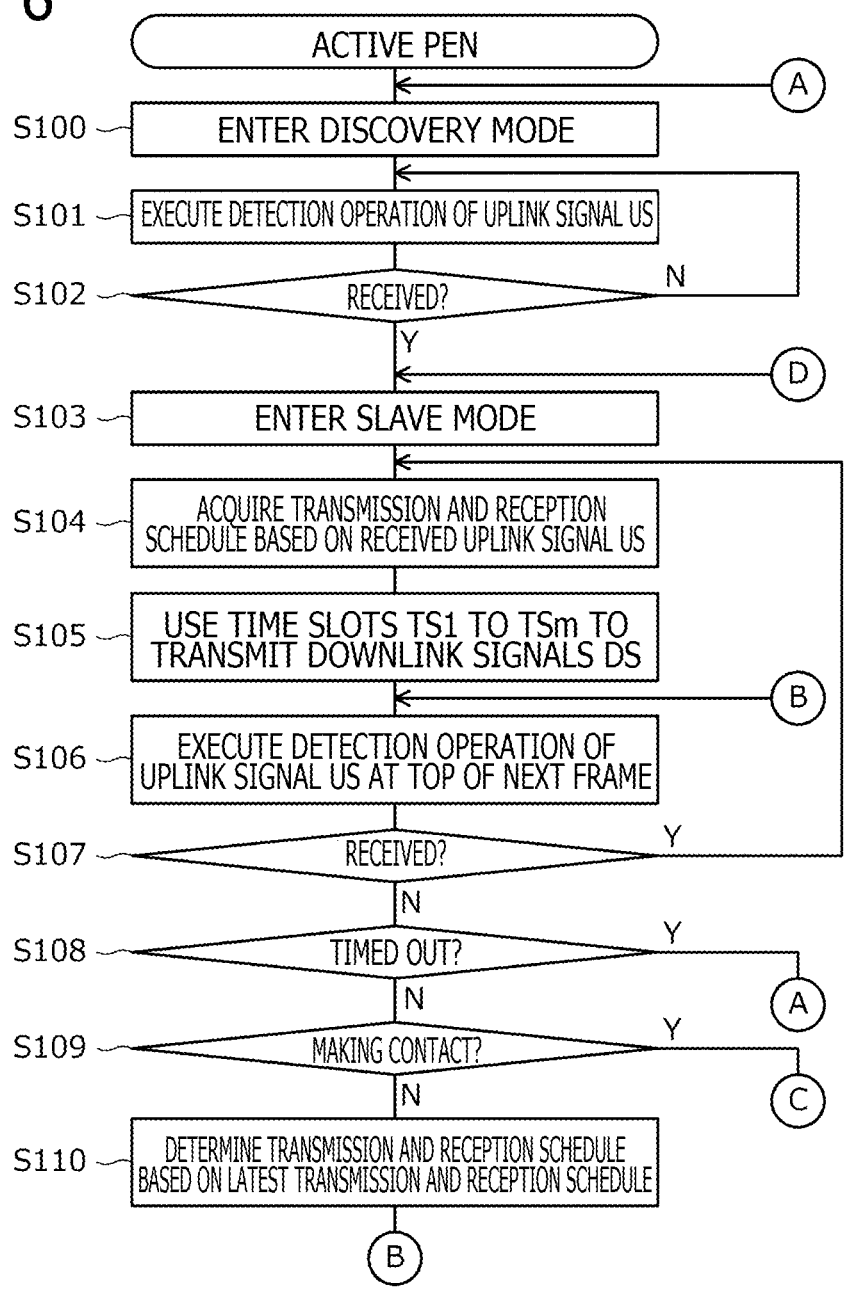
FIG. 6 is a process flow diagram illustrating a process executed by the integrated circuit 25 of the active pen 2.
Figure 7:
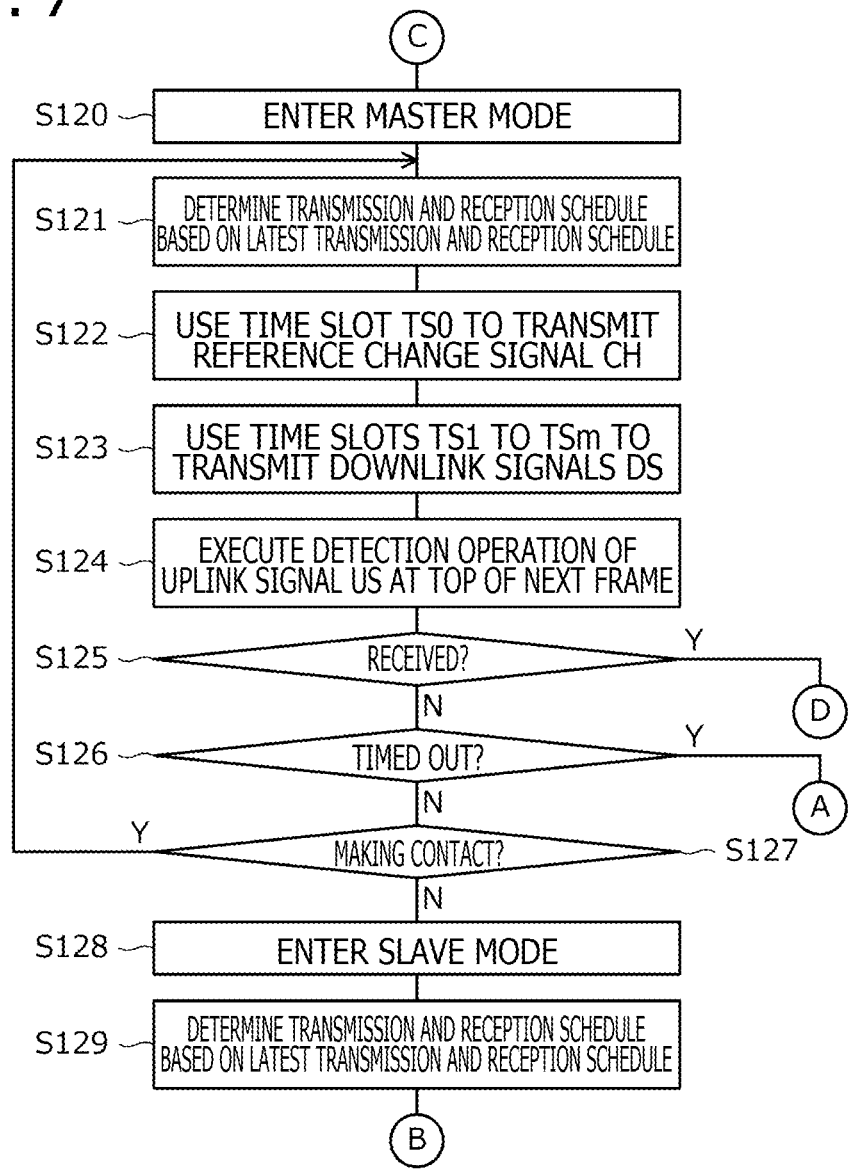
FIG. 7 is a process flow diagram illustrating a process executed by the integrated circuit 25 of the active pen 2.

FIGS. 6 and 7 are process flow diagrams illustrating a process executed by the integrated circuit 25 of the active pen 2. As illustrated in FIGS. 6 and 7, the integrated circuit 25 first enters the discovery mode (step S100) and executes the detection operation of the uplink signal US (step S101). The integrated circuit 25 then determines whether or not the uplink signal US is received (step S102). If the integrated circuit 25 determines that the uplink signal US is not received, the integrated circuit 25 returns to step S101 and continues the process of the discovery mode.

On the other hand, if the integrated circuit 25 determines that the uplink signal US is received in step S102, the integrated circuit 25 enters the slave mode (step S103) and acquires the transmission and reception schedule based on the received uplink signal US (step S104). The integrated circuit 25 then uses the time slots TS1 to TSm to transmit the downlink signals DS (step S105) and executes the detection operation of the uplink signal US at the beginning of the next frame (step S106). The integrated circuit 25 in this case does not transmit any signal in the time slot TS0.

Next, the integrated circuit 25 determines whether or not the uplink signal US is received in step S106 (step S107). If the integrated circuit 25 determines that the uplink signal US is received, the integrated circuit 25 returns to step S104 and continues the process of the slave mode.

On the other hand, if the integrated circuit 25 determines that the uplink signal US is not received, the integrated circuit 25 first determines whether or not a predetermined time period has passed since the last reception of the uplink signal US (step S108). If the integrated circuit 25 determines that the predetermined time period has passed, the integrated circuit 25 returns to step S100 and starts the process of the discovery mode. On the other hand, the integrated circuit 25, upon determining that the predetermined time period has not passed, refers to the last pen pressure value supplied from the pressure sensor 22 illustrated in FIG. 1 to determine whether or not the active pen 2 is making a contact (a state in which the pen tip is in contact with the touch surface 3a) (step S109).

Specifically, the integrated circuit 25 can determine that the active pen 2 is making a contact when the pen pressure value is a value greater than 0. The integrated circuit 25 can determine that the active pen 2 is hovering (a state in which the pen tip is not in contact with the touch surface 3a) otherwise. If the integrated circuit 25 determines that the active pen 2 is hovering, the integrated circuit 25 determines the transmission and reception schedule based on the last acquired transmission and reception schedule (step S110) and then returns to step S106 to continue the process of the slave mode. On the other hand, if the integrated circuit 25 determines that the active pen 2 is making a contact, the integrated circuit 25 moves to step S120 illustrated in FIG. 7 and starts the process of the master mode. In this way, the integrated circuit 25 shifts to the master mode only when the active pen 2 is making a contact, and the integrated circuit 25 continues the process of the slave mode when the active pen 2 is hovering. This is because, when the active pen 2 is hovering, no stoke is being input and thus no break in a line could occur.

The process from step S120 will be now specifically described. As illustrated in FIG. 7, the integrated circuit 25 first enters the master mode (step S120) and determines the transmission and reception schedule based on the last transmission and reception schedule as in step S110 (step S121).

Next, the integrated circuit 25 uses the time slot TS0 to transmit the reference change signal CH (step S122) and uses the time slots TS1 to TSm to transmit the downlink signals DS (step S123). The integrated circuit 25 executes the detection operation of the uplink signal US at the beginning of the next frame (step S124).

The integrated circuit 25 then determines whether or not the uplink signal US is received in step S16 (step S125). If the integrated circuit 25 determines that the uplink signal US is received, the integrated circuit 25 returns to step S103 and starts the process of the slave mode. On the other hand, if the integrated circuit 25 determines that the uplink signal US is not received, the integrated circuit 25 first determines whether or not the predetermined time period has passed since the last reception of the uplink signal US (step S126). If the integrated circuit 25 determines that the predetermined time period has passed, the integrated circuit 25 returns to step S100 illustrated in FIG. 6 and starts the process of the discovery mode. On the other hand, the integrated circuit 25, upon determining that the predetermined time period has not passed, refers to the last pen pressure value supplied from the pressure sensor 22 illustrated in FIG. 1 to determine whether or not the active pen 2 is making a contact (step S127). The specific method of the determination may be similar to the method of step S109. As a result of the determination, the integrated circuit 25 that has determined that the active pen 2 is making a contact returns to step S121 and continues the process of the master mode. On the other hand, the integrated circuit 25 that has determined that the active pen 2 is hovering enters the slave mode (step S128) and determines a transmission and reception schedule based on the last transmission and reception schedule as in step S110 (step S129). The integrated circuit 25 then returns to step S106 illustrated in FIG. 6. The reason why the integrated circuit 25, despite having entered the slave mode, determines in step S129 the transmission and reception schedule based on the last transmission and reception schedule is that the current transmission and reception schedule is necessary for the active pen 2 to receive the next uplink signal US.

Figure 8:
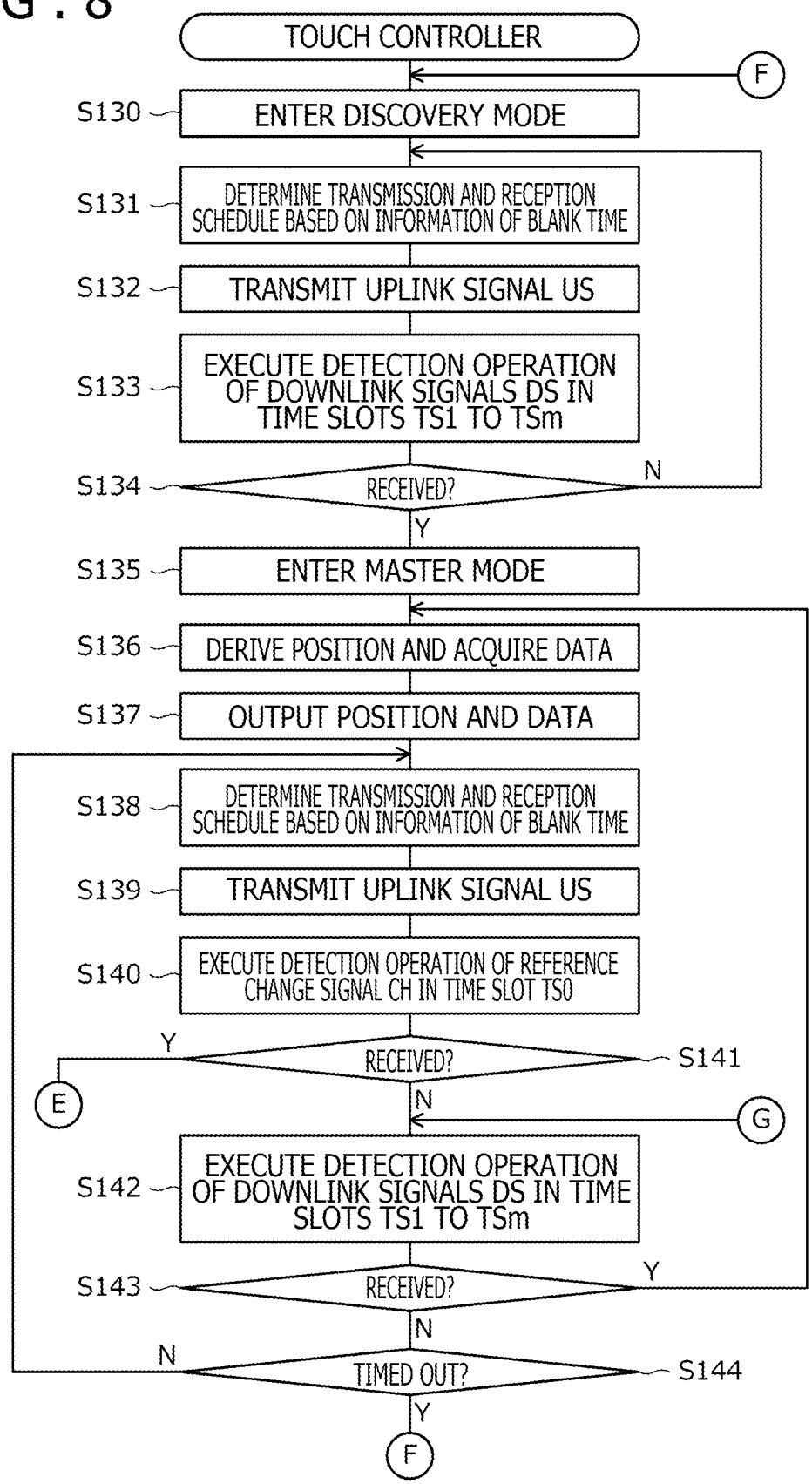
FIG. 8 is a process flow diagram illustrating a process executed by the touch controller 31.
Figure 9:
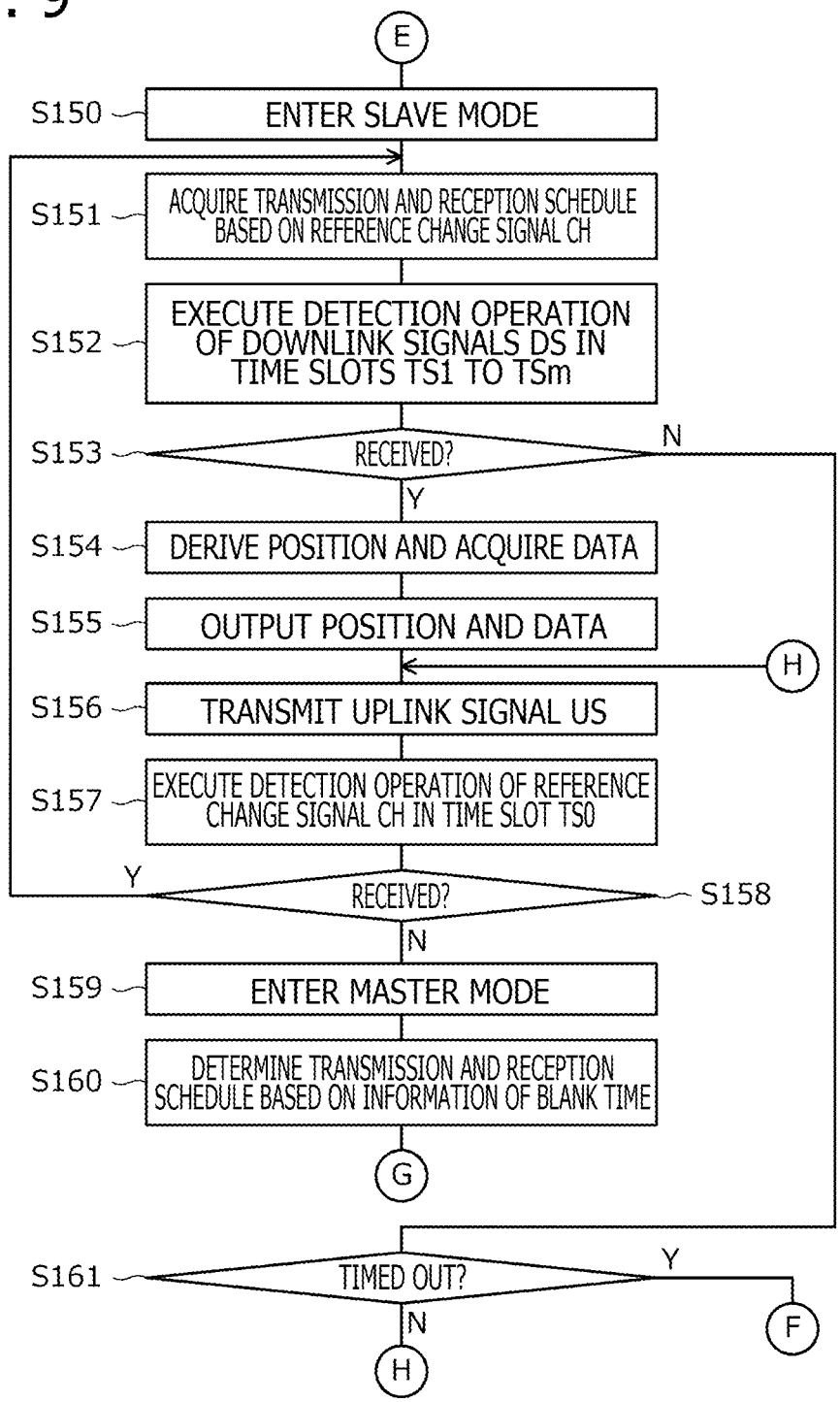
FIG. 9 is a process flow diagram illustrating a process executed by the touch controller 31.

FIGS. 8 and 9 are process flow diagrams illustrating a process executed by the touch controller 31. As illustrated in FIGS. 8 and 9, the touch controller 31 first enters the discovery mode (step S130) and determines the transmission and reception schedule based on the information regarding the blank time period supplied from the host processor 33 (step S131). The touch controller 31 then transmits the uplink signal US at the beginning of the frame (step S132) and further executes the detection operation of the downlink signals DS in the time slots TS1 to TSm (step S133). The touch controller 31 does not have to perform, though it may perform, the detection operation of the reference change signal CH in the time slot TS0.

Next, the touch controller 31 determines whether or not the downlink signal DS is received in step S133 (step S134). If the touch controller 31 determines that the downlink signal DS is not received, the touch controller 31 returns to step S131 and continues the process of the discovery mode. On the other hand, if the touch controller 31 determines that the downlink signal DS is received, the touch controller 31 enters the master mode (step S135). The touch controller 31 derives the position of the active pen 2 based on the received downlink signal DS and acquires the data transmitted from the active pen 2 (step S136). The touch controller 31 outputs the position and the data to the host processor 33 (step S137). The touch controller 31 then executes a process similar to the process of step S131 to again determine a transmission and reception schedule (step S138). The touch controller 31 transmits the uplink signal US at the beginning of the next frame (step S139) and executes the detection operation of the reference change signal CH in the time slot TS0 (step S140).

The touch controller 31 determines whether or not the reference change signal CH is received in step S140 (step S141). If the touch controller 31 determines that the reference change signal CH is received, the touch controller 31 moves to step S150 illustrated in FIG. 9 and starts the process of the slave mode. On the other hand, the touch controller 31 that has determined that the reference change signal CH is not received executes the detection operation of the downlink signals DS in the time slots TS1 to TSm (step S142) and determines whether or not the downlink signal DS is received (step S143). As a result, the touch controller 31 that has determined that the downlink signal DS is received returns to step S136 and continues the process of the master mode. On the other hand, the touch controller 31 that has determined that the downlink signal DS is not received determines whether or not the predetermined time period has passed since the last reception of the downlink signal DS (step S144). As a result, if the touch controller 31 determines that the predetermined time period has passed, the touch controller 31 returns to step S130 and starts the process of the discovery mode. On the other hand, the touch controller 31 that has determined that the predetermined time period has not passed returns to step S138 and continues the process of the master mode.

The process from step S150 will be now specifically described. As illustrated in FIG. 9, the touch controller 31 first enters the slave mode (step S150) and acquires the transmission and reception schedule based on the reference change signal CH (step S151). That is, the touch controller 31 assumes that the reception start timing of the reference change signal CH is the start timing of the time slot TS0 and acquires the frame position. Next, the touch controller 31 executes the detection operation of the downlink signals DS in the time slots TS1 to TSm (step S152) and determines whether or not the downlink signal DS is received (step S153). As a result, if the touch controller 31 determines that the downlink signal DS is received, the touch controller 31 derives the position of the active pen 2 based on the received downlink signal DS and acquires the data transmitted by the active pen 2 (step S154). The touch controller 31 outputs the position and the data to the host processor 33 (step S155). The touch controller 31 then transmits the uplink signal US at the beginning of the next frame (step S156) and executes the detection operation of the reference change signal CH in the time slot TS0 (step S157). The touch controller 31 determines whether or not the reference change signal CH is received (step S158).

The touch controller 31 that has determined that the reference change signal CH is received in step S158 returns to step S151 and continues the process of the slave mode. On the other hand, the touch controller 31 that has determined that the reference change signal CH is not received enters the master mode (step S159). The touch controller 31 determines the transmission and reception schedule based on the information regarding the blank time period supplied from the host processor 33 (step S160) and then returns to step S142 illustrated in FIG. 8. Thereafter, starting with the first uplink signal US transmission (step S139), the transmission and reception schedule determined in step S160 is applied. The reason that the transmission and reception schedule determined in step S160 is not applied in step S142 just after being transitioned from step S160 is that the downlink signal DS transmission at this point is performed according to the transmission and reception schedule determined by the active pen 2.

The touch controller 31 that has determined that the downlink signal DS is not received in step S153 determines whether or not the predetermined time period has passed since the last reception of the downlink signal DS (step S161). As a result, if the touch controller 31 determines that the predetermined time period has passed, the touch controller 31 returns to step S130 illustrated in FIG. 8 and starts the process of the discovery mode. On the other hand, the touch controller 31 that has determined that the predetermined time period has not passed returns to step S156 and continues the process of the slave mode.

As described above, according to the position detection system 1 of the present embodiment, the active pen 2 can be the master of frame synchronization when the active pen 2 fails to receive the uplink signal US. This can prevent a break in a line even when the active pen 2 fails to receive the uplink signal US.

In addition, according to the position detection system 1 of the present embodiment, the active pen 2 can be the master of frame synchronization only when the active pen 2 is making a contact. Therefore, the active pen 2 can be the master of frame synchronization only when there is a need to prevent a break in a line.

Although the preferred embodiment of the present invention has been described, the present invention is not limited to the embodiment in any way, and it is obvious that the present invention can be carried out in various embodiments without departing from the scope of the present invention.

For example, although the touch controller 31 in the embodiment uses an active electrostatic system to detect the position of the active pen 2, the present invention can be widely applied where the touch controller 31 and the active pen 2 perform two-way communication. For example, the present invention can also be applied where the touch controller 31 uses an electro-magnetic resonance system to detect the position of the active pen 2.

In addition, although the top slot in the frame is reserved for the transmission of a reference change signal CH in the example described in the embodiment, it is only necessary that the active pen 2 be able to transmit the reference change signal CH to the touch controller 31 in a timely manner, and the transmission method of the reference change signal CH is not limited to the example described in the embodiment. For example, the active pen 2 may use a time slot other than the top slot to transmit the reference change signal CH. The active pen 2 may use, with respect to the downlink signal DS, a different frequency, a different phase, a different sign, etc., to transmit the reference change signal CH at the same time as the transmission of the downlink signal DS. The active pen 2 may use a completely different communication method, such as a near field communication method according to the Bluetooth® protocol, to transmit the reference change signal CH.

In addition, although in the described embodiment whether or not the reference change signal CH is present indicates whether or not the active pen 2 is to be the master of synchronization, any suitable method may be used to notify the touch controller 31 of the information indicating whether or not the active pen 2 is to be the master of synchronization. For example, the active pen 2 can transmit, depending on whether it is the master of synchronization or not, different bit values, different frequencies, different phases, or different signs, to thereby notify the touch controller 31 of whether or not the active pen 2 is the master of synchronization. In the example in which the active pen 2 uses "different bit values," the active pen 2 may use 1 bit in the data signal included in the downlink signal DS to transmit the reference change signal CH.

In addition, although in the described embodiment the reference change signal CH is also used as a reference signal for synchronizing the frame position, the reference change signal CH and the reference signal may be different signals. For example, the touch controller 31 in the slave mode may acquire the frame position based on the reception timing of the downlink signal DS received in the time slot TS1.

DESCRIPTION OF REFERENCE SYMBOLS

1: Position detection system
2: Active pen
3: Electronic device
3a: Touch surface
20: Core body
21: Pen tip electrode
22: Pressure sensor
23: Side switch
24: Battery
25: Integrated circuit
30: Sensor
31: Touch controller
32: Display
33: Host processor
CH: Reference change signal
DS: Downlink signal
F: Frame
TS: Time slot
US: Uplink signal

The invention claimed is:

1. An integrated circuit configured to control a pen to perform two-way communication with a touch controller, wherein
the integrated circuit:
performs a detection operation of a reference signal according to a frame position acquired on a basis of a previous reference signal transmitted from the touch controller and received by the pen;
determines whether or not the reference signal is received in the detection operation; and
transmits, from the pen, a reference change signal indicating that the pen is to be a master of synchronization of the frame position when the reference signal is not received in the detection operation.

2. The integrated circuit according to claim 1, wherein
the reference change signal is a signal in which any one of a different bit value, a different frequency, a different phase, and a different signal is used to notify that the pen is to be the master of synchronization, and
the integrated circuit repeatedly transmits the reference change signal.

3. The integrated circuit according to claim 1, wherein
the integrated circuit repeatedly transmits the reference change signal.

4. The integrated circuit according to claim 1, wherein the integrated circuit transmits the reference change signal to the touch controller when the reference signal is not received in the detection operation and a predetermined condition is satisfied.

5. The integrated circuit according to claim 4, wherein the predetermined condition is that the pen is making a contact.

6. The integrated circuit according to claim 4, wherein
the predetermined condition is that the pen is making a contact, and
the integrated circuit determines that the pen is making a contact based on a pen pressure value indicating a pressure applied to a pen tip of the pen.

7. The integrated circuit according to claim 1, wherein
the integrated circuit transmits the reference change signal while the master of synchronization is the touch controller.

8. The integrated circuit according to claim 1, wherein
the integrated circuit transmits the reference signal at least once at a same time as the transmission of the reference change signal or after the transmission of the reference change signal.

9. The integrated circuit according to claim 1, wherein the integrated circuit receives a reference change signal indicating that the touch controller is to be the master of synchronization.

10. A method executed by an integrated circuit included in a pen to perform two-way communication with a touch controller, the method comprising:
performing a detection operation of a reference signal according to a frame position acquired on a basis of a previous reference signal transmitted from the touch controller and received by the pen;
determining whether or not the reference signal is received in the detection operation; and
transmitting, from the pen, a reference change signal indicating that the pen is to be a master of synchronization of the frame position when it is determined that the reference signal is not received in the detection operation.

11. The method according to claim 10, wherein
the reference change signal is a signal in which any one of a different bit value, a different frequency, a different phase, and a different signal is used to notify that the pen is to be the master of synchronization, and
the method comprises repeatedly transmitting the reference change signal.

12. The method according to claim 10, comprising:
repeatedly transmitting the reference change signal.

13. The method according to claim 10, comprising: transmitting the reference change signal to the touch controller when it is determined that the reference signal is not received in the detection operation and a predetermined condition is satisfied.

14. The method according to claim 13, wherein the predetermined condition is that the pen is making a contact.

15. The method according to claim 13, wherein
the predetermined condition is that the pen is making a contact, and
the method comprises determining that the pen is making a contact based on a pen pressure value indicating a pressure applied to a pen tip of the pen.

16. The method according to claim 10, comprising:
transmitting the reference change signal while the master of synchronization is the touch controller.

17. The method according to claim 10, comprising:
transmitting the reference signal at least once at a same time as the transmission of the reference change signal or after the transmission of the reference change signal.

18. The method according to claim 10, comprising:
receiving a reference change signal indicating that the touch controller is to be the master of synchronization.

\* \* \* \* \*